Patented May 31, 1938

2,118,903

UNITED STATES PATENT OFFICE 2,118,903

PROCESS FOR THE MANUFACTURE OF NITROGEN TRICHLORIDE

Erich Staudt, Deventer, Netherlands

No Drawing. Application November 26, 1935, Serial No. 51,714. In Germany December 4, 1934

8 Claims. (Cl. 204—9)

Among the objects of this present invention is the provision of process and electrolyte for preparing nitrogen trichloride and substances containing this compound in a very efficient, reliable and simple way. Especially, an object consists in preparing nitrogen trichloride and substances containing nitrogen trichloride in such a way and of obtaining them in such a form that treatments of natural products such as flour, meal, milling products and the like and other vegetable materials according to my copending application Serial No. 51,712 (filed concurrently herewith) may be carried out conveniently. Hitherto it has been customary to prepare nitrogen trichloride by the interaction of chlorine gas and solutions of ammonium salts. The chlorine gas was taken in compressed condition from bombs and fed into the solution of the ammonium salt. It stands to reason that the use of the compressed chlorine gas is a serious drawback in this known process.

According to the present invention nitrogen trichloride and susbtances containing nitrogen trichloride may be prepared in an easy, convenient and inexpensive way by subjecting solutions containing ammonium and chloride ions and preferably also containing an added acid to an electrolyzing process. This electrolyte containing ammonium and chloride ions may be prepared in the easiest way by dissolving ammonium chloride in water. Various concentrations of this ammonium chloride solution have given satisfactory results, e. g., 25 to 300 grams of ammonium chloride may be dissolved in 1 liter of water in preparing the electrolyte to be used in the process. Instead of using ammonium chloride, the solution may be prepared with the aid of ammonia and hydrochloric acid in the required proportions. It is also possible to use other salts of ammonium, e. g., ammonium sulphate, ammonium phosphate, as a source of the ammonium ions, and in such event the chloride ions may be furnished by dissolving a chloride such as sodium chloride or potassium chloride together with the ammonium salt in water. As a matter of fact the most convenient way of getting a solution containing ammonium and chloride ions is by dissolving ammonium chloride in water. It is to be appreciated, in view of the foregoing, that when ammonium salts (other than ammonium chloride) and soluble chlorides are used in forming the solution to be electrolyzed, the ammonium radicals of such salts and the chloride radicals of such soluble chlorides in the water solution provide ammonium chloride in solution, and in certain of the appended claims this ammonium chloride in solution whether produced by dissolving ammonium chloride in water, or by dissolving another salt of ammonia and a soluble chloride in water, is referred to as "available ammonium chloride". The acid used in the process of the invention is preferably hydrochloric acid. Other acids, such as sulphuric acid and phosphoric acid are equally suitable. However by using a solution of ammonium chloride acidified with hydrochloric acid, all the ions that are present in the electrolyte are efficiently used for making the nitrogen trichloride, so that this solution is also the most economical one. If ammonia and hydrochloric acid are used in such proportions that a surplus (of an extent as indicated below) of hydrochloric acid over the quantity required for the neutralization of the ammonia is present, a solution results that has the desired composition.

According to the present invention nitrogen trichloride may be prepared electrolytically with a very high yield, if use is made of an acidified water solution of ammonium chloride as an electrolyte, or an acidified solution containing ammonium and chloride ions as electrolyte. A number of experiments were performed with increasing quantities of hydrochloric acid in equal quantities of electrolyte. In these experiments 400 cc. of electrolyte were used in all cases, and 110 grams of ammonium chloride were present. Current strength and tension were the same in all experiments. Per hour was formed:

(a) Without addition of hydrochloric acid 0.055 g. of nitrogen trichloride.

(b) With 6 ccm. of hydrochloric acid 1.19 (pro 400 cc. electrolyte), 0.42 g. of nitrogen trichloride.

(c) With 16 ccm. of hydrochloric acid 1.19 (pro 400 cc. electrolyte), 0.53 g. of nitrogen trichloride.

(d) With 66 ccm. of hydrochloric acid 1.19 (pro 400 cc. electrolyte), 0.84 g. of nitrogen trichloride.

(e) With 116 ccm. of hydrochloric acid 1.19 (pro 400 cc. electrolyte), 1.62 g. of nitrogen trichloride.

The quantity of hydrochloric acid or other acid that is used per gram-molecule of ammonium chloride may fluctuate between broad limits, e. g., both with one-tenth and 2 gram-equivalents of acid per gram-molecule of ammonium chloride, good results have been obtained. It is to be noted that the solutions employed in the electrolysis according to the present invention contain free acid which imparts to the solutions an acidity greater than the acidity of solutions consisting of ammonium chloride dissolved in water. It was further found, that starting with solutions having a rather high degree of acidity this acidity diminishes in the course of the electrolyzing process, so that apparently the electrolytic reaction takes place in these cases with consumption of acid. Under these circumstances it may be advisable not to make the quantity of the acid added at the beginning too small and, if desired, to add fresh acid from time to time, especially when the electrolyzing process is running continuously.

However it must be stated that the acidity of the electrolyte has a tendency to decrease to a certain limit and to stay approximately at that limit when the electrolysis is continued for a long period of time. This limit of the acidity reached in the course of the electrolyzing process lies at such a point that the electrolyte having this acidity yields satisfactory results. In another way of carrying out the invention, the electrolysis may be started with a solution having a relatively high acidity which diminishes during the course of the electrolyzing process to a certain limit and no fresh hydrochloric acid is added.

It stands to reason that from time to time a fresh quantity of ammonium and chloride ions, preferably in the form of solid ammonium chloride has to be supplied to the electrolyte.

In a preferred manner of practicing the process of the invention, the nitrogen trichloride formed remains in the electrolyte only in small percentage. The main quantity of the nitrogen trichloride formed is or may be carried off or vaporized, e. g., by diminishing the pressure of the gas over the electrolyte or by blowing air or another gas through the electrolyte, which air or gas carries the nitrogen trichloride formed with it. The gas containing nitrogen trichloride may be transported with the aid of tubes and the like to the places where it is needed.

In the process according to the invention besides nitrogen trichloride, other products are formed in smaller or larger proportions, e. g., at the cathode a development of hydrogen gas takes place, and moreover, the gas separated from the electrolyte in one of the manners described may contain small quantities of chlorine, oxygen, nitrogen dioxide, ozone, etc. It has been found that these impurities, as a rule, are not harmful in the application of the nitrogen trichloride to the treatment of natural materials, especially flour, meal, milling products and the like, and other vegetable substances, or to the treatment of water and sewage as described in the copending applications of this series, Serial Nos. 51,712 and 51,713 and filed concurrently herewith.

The manufacture of nitrogen trichloride according to the electrochemical process of the present invention may be carried out in electrolyzing cells of various forms. Exceedingly good results have been achieved in high, relatively narrow cells in which the depth of the liquid is great, as well as low cells with a little depth of electrolyte. In the latter case the maximum distance between the electrodes and the surface of the liquid is small. In order to recover practically all the volatile products formed in the electrolyzing process it is advisable to operate in hermetically closed cells.

The electrolyzing cells are made from materials that are resistant to the substances present in the electrolyte and to the products of the electrolysis. Acid proof stone-ware and ebonite are, for example, suitable materials. The same applies to the tubes or other devices for carrying off the volatile products of the electrolysis.

The electrodes of the cells should be made of material which is resistant to the electrolyte and to the products of the electrolysis. Electrodes of platinum, of magnetite ($Fe_3O_4$), of alloys of iron and silicon containing a high proportion of the last mentioned material, of graphite, especially dense graphite rods or plates, are suitable.

It is advisable to wrap asbestos rope or cord, or like materials, around the cathodes in order to prevent the phenomena of reduction at the cathodes that decrease the yield. Other measures that are known to diminish the cathodic reduction may also advantageously be applied.

The application of diaphragms is not necessary, but it is of some importance to keep the electrolyte in agitation during the electrolyzing process, for example by stirring, or by blowing or aspirating air or suitable gas into or through the electrolyte, which air or gas carries nitrogen trichloride away from the electrolyte. The air or gas containing nitrogen trichloride is collected in any suitable manner, and may be used for the purposes above described or any other purpose.

The current density may be fairly high. Good results have, e. g., been obtained with an anodic current density lying between 0.05 and 0.75 amp./$cm^2$.

In the above mentioned uses of the produced nitrogen trichloride, instead of applying the gas or nitrogen chloride vapors separated out of the electrolyte, the electrolyzed electrolyte itself, in which products of electrolysis are dissolved, may be used. When operating in the latter manner, the electrolyte in the electrolyzing cells may be continuously or discontinuously renewed.

I claim:

1. Process for producing nitrogen trichloride which comprises electrolyzing an aqueous solution containing ammonium and chloride ions in the presence of free acid which imparts to the solution an acidity greater than the acidity of solutions consisting of ammonium chloride dissolved in water, and removing nitrogen trichloride from the solution during its electrolysis.

2. Process for producing nitrogen trichloride which comprises electrolyzing an aqueous solution containing ammonium and chloride ions and free hydrochloric acid, and removing nitrogen trichloride from the solution during its electrolysis.

3. Process for producing nitrogen trichloride which comprises electrolyzing an aqueous solution containing ammonium and chloride ions in the presence of free acid which imparts to the solution an acidity greater than the acidity of solutions consisting of ammonium chloride dissolved in water, and conducting a gas through the solution during the electrolysis thereof to remove nitrogen trichloride, said gas being of such a nature that in its passage through the solution nitrogen trichloride is carried out of the solution by said gas.

4. Process for producing nitrogen trichloride which comprises electrolyzing an aqueous solution containing ammonium and chloride ions in the presence of free acid which imparts to the solution an acidity greater than the acidity of solutions consisting of ammonium chloride dissolved in water, and reducing the gas pressure over the solution during the electrolysis thereof to remove nitrogen trichloride from the solution.

5. Process for producing nitrogen trichloride which comprises electrolyzing an aqueous solution containing ammonium and chloride ions and free hydrochloric acid, and conducting a gas through the solution during the electrolysis thereof to remove nitrogen trichloride, said gas being of such a nature that in its passage through the solution nitrogen trichloride is carried out of the solution by said gas.

6. Process for producing nitrogen trichloride which comprises electrolyzing an aqueous solution containing ammonium and chloride ions and free hydrochloric acid, and reducing the gas pressure over the solution during the electrolysis thereof to remove nitrogen trichloride from the solution.

7. Process for producing nitrogen trichloride which comprises electrolyzing an aqueous solution containing ammonium and chloride ions in the presence of at least $\frac{1}{10}$ gram equivalent of a strong mineral acid per gram molecule of available ammonium chloride in said solution.

8. Process for producing nitrogen trichloride which comprises electrolyzing an aqueous solution containing ammonium chloride and at least $\frac{1}{10}$ gram equivalent of free hydrochloric acid per gram molecule of dissolved ammonium chloride.

ERICH STAUDT.